W. W. SHONK & J. A. HUTCHINSON.
LATHE.
APPLICATION FILED DEC. 9, 1908.
952,474.
Patented Mar. 22, 1910.
2 SHEETS—SHEET 1.
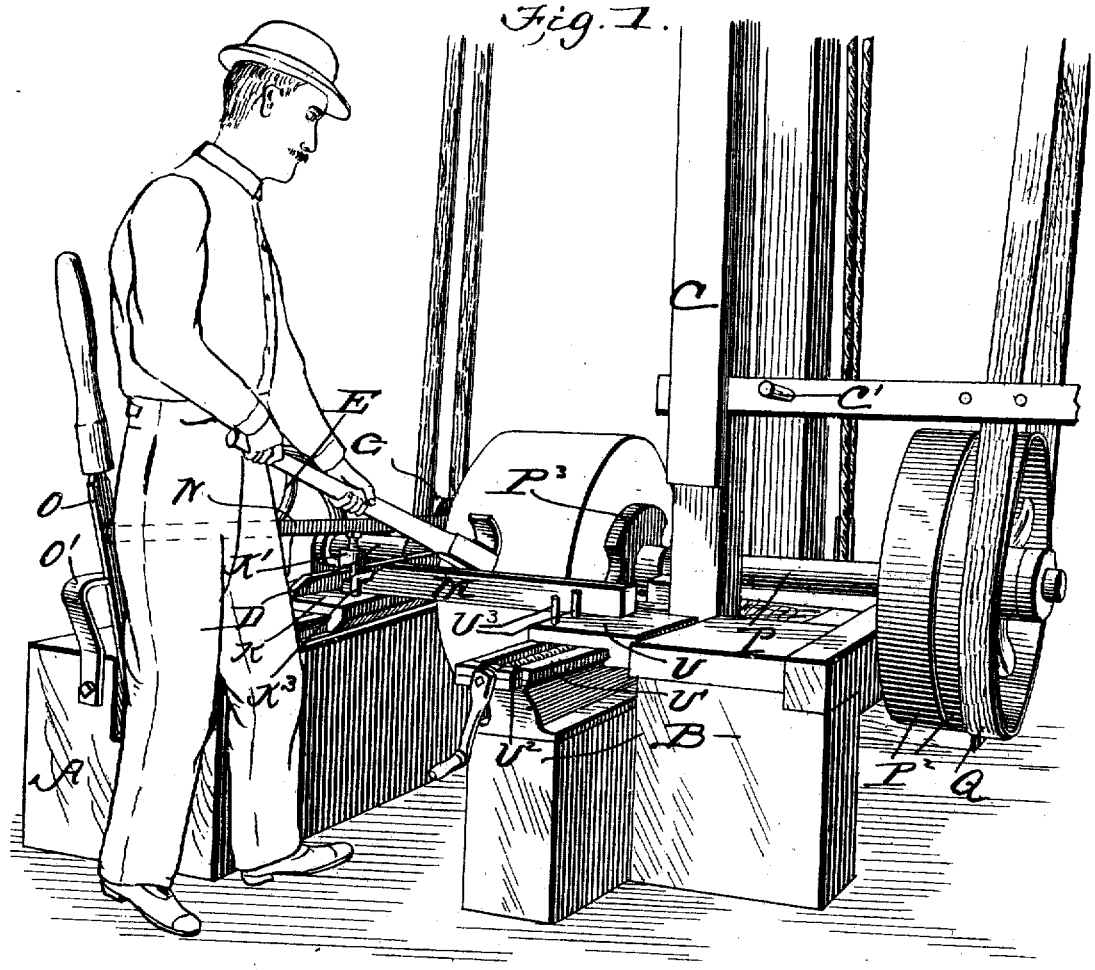
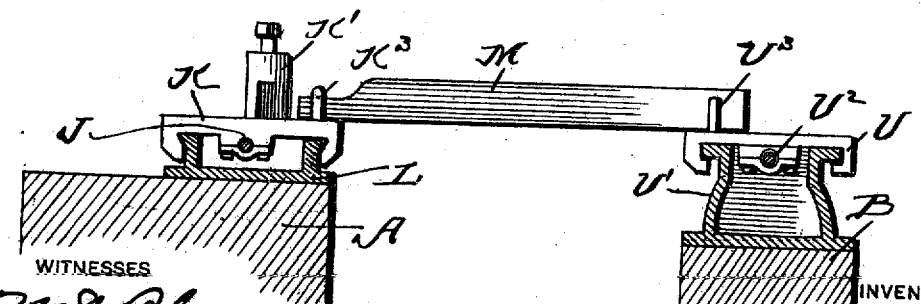

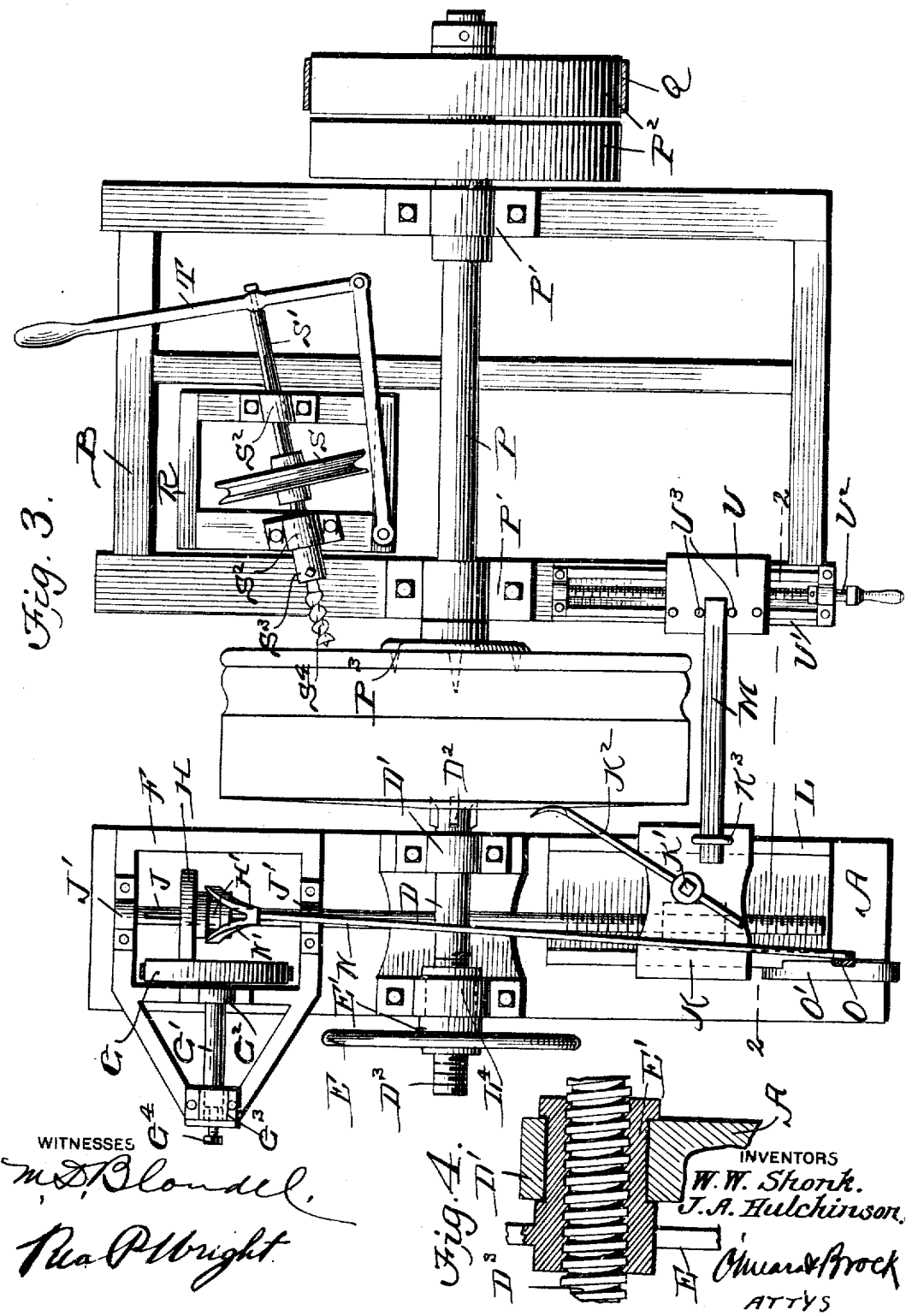

UNITED STATES PATENT OFFICE.

WILLIAM W. SHONK AND JOHN A. HUTCHINSON, OF MOUND CITY, ILLINOIS, ASSIGNORS TO O. L. BARTLETT, OF MOUND CITY, ILLINOIS.

LATHE.

952,474.  Specification of Letters Patent.  Patented Mar. 22, 1910.

Application filed December 9, 1905. Serial No. 291,139.

*To all whom it may concern:*

Be it known that we, WILLIAM W. SHONK and JOHN A. HUTCHINSON, citizens of the United States, residing at Mound City, in the county of Pulaski and State of Illinois, have invented a new and useful Improvement in Lathes, of which the following is a specification.

Our invention relates to certain new and useful improvements in wood turning lathes, and has for its object to provide a lathe that is especially adapted for turning butchers' blocks, wooden rollers, and the like.

Another object of our invention is to provide a knife adjusting means in connection with the lathe, so that the knife will travel over the face of the block, cutting a perfectly true and smooth surface.

Another object of our invention is to provide an adjustable tool rest in connection with the lathe so that it can be easily and quickly adjusted up against the work in the lathe, or away from it, or removed as desired.

A still further object of our invention is to provide an auger in connection with the lathe so that holes can be bored in the work, without removing it from the lathe.

With these objects in view, the invention consists of the novel features of construction, combination and arrangement of parts, hereinafter fully described, and pointed out in the claim.

In the drawings forming a part of this specification:—Figure 1 is a perspective view of the lathe. Fig. 2 is a vertical section through the supports and guide-ways showing the carriages carrying the tool rest in place. Fig. 3 is a top plan view of the lathe, the frame being omitted. Fig. 4 is a section through the adjusting wheel and bearing.

Referring to the drawings A and B, indicate the supports and C, the frame of the lathe. Journaled in a bearing D', on the support A, is a tail block D, provided with the usual head $D^2$, and screw threaded end $D^3$, on which is mounted a wheel E, provided with an outwardly projecting flanged collar E', which is journaled in a bearing $D^4$, so that the tail block can be adjusted. Secured to the rear of the support A, is a frame F, carrying a pulley G, mounted on a shaft G', journaled in the bearings $G^2$ and $G^3$, on which a belt is adapted to travel. The bearing $G^3$, is provided with an adjusting screw $G^4$, which is adapted to engage the end of the shaft to regulate the adjustment of the same. One side of the pulley is provided with a frictional surface adapted to be engaged by a friction wheel H, keyed on the slotted shaft J, which is journaled in the bearing J', and is provided with a screw-threaded end which extends forward through an ordinary threaded block carried by a carriage K, mounted on a suitable guide-way L, secured to the support. By means of the adjusting screw $G^4$ the friction between the side of the pulley G and the periphery of the friction wheel H may be regulated. The carriage is provided with a tool post K', in which the knife $K^2$, is adapted to be secured. A U-shaped guide-eye $K^3$, extends up from one side of the carriage K, in which one end of the tool rest M, is adapted to fit, which is only used when operating on the periphery of the work.

The friction wheel H, is provided with a grooved collar H', to which the forked end N', of the rod N, is secured. The other end is connected to a lever O, pivoted in a slot formed in the support A, and working against the rack O', arranged on the support adjacent the slot, and by sliding the friction wheel H, first to one side of the center of the pulley G, and then to the other side for rotating the shaft in one direction, and then in the opposite direction so that the knife will be forced to travel in and out, over the surface of the work as desired.

Mounted on the support B, in the journals P', is a shaft P, provided with the ordinary pulleys $P^2$, at one end, over which the drive belt Q, is adapted to pass, and is provided with a work holder $P^3$, at the other end which is adapted to support the work being turned. A frame R, is mounted on the rear of the support B, and is provided with a pulley S, mounted on a slotted shaft S', journaled in bearings $S^2$, at an angle to the support. One end of the shaft is provided with a socket $S^3$, in which a bit $S^4$, is adapted to be secured. The other end projects out to one side of the frame and is loosely connected to a hand-crank T, pivoted to the frame and by means of which the bit can be shoved in or out, as desired.

A carriage U is mounted on a guide-way U', secured to the support, and is provided with ordinary screw-adjusting means $U^2$, connected to the carriage. The carriage is provided with upwardly extending pins U³, between which the other end of the tool rest M, is adapted to fit. The rest M is detached when operating on the face of the block and is only used when operating on the periphery of the same and it will be readily seen that when the rest is in position it can be adjusted when desired by operating the carriages K and U.

Openings are formed in the frame C, in which pins C′, are adapted to fit forming guideways for the belt.

Having thus fully described our invention, what we claim as new and desire to secure by Letters Patent is:—

In a lathe the combination with a pair of guide-ways, of carriages slidably mounted on said guide-ways, spaced vertical pins arranged on one of said carriages and an eye arranged on the other carriage for holding a tool rest, threaded blocks arranged under said carriages, a hand operated screw mounted in the block carried by the carriage with the pins, a threaded shaft working in the block of the other carriage, said shaft being provided with a slotted end portion, a frictional wheel keyed on the slotted end of said shaft, a drive pulley having its face into contact with the edge of said wheel and means connected to said frictional wheel for adjusting the same with respect to the face of the drive pulley.

WILLIAM W. SHONK.
JOHN A. HUTCHINSON.

Witnesses:
W. A. DICKSON,
GEO. R. CONRAD.